United States Patent Office 2,885,260
Patented May 5, 1959

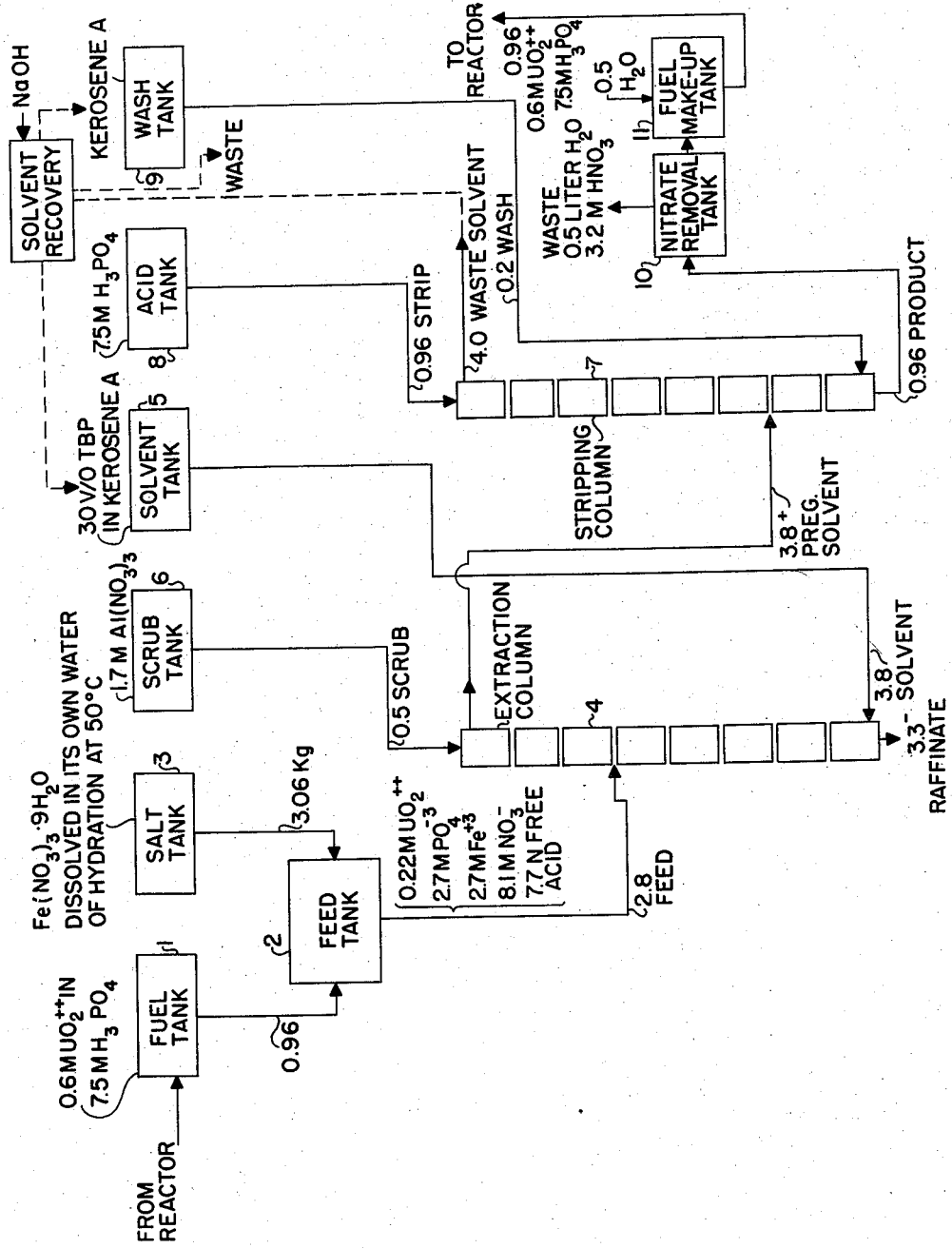

2,885,260

METHOD FOR DECONTAMINATION OF REACTOR SOLUTIONS

William J. Maraman, Horace R. Baxman, and Richard D. Baker, Los Alamos, N. Mex., assignors to the United States of America as represented by the United States Atomic Energy Commission Application April 23, 1957, Serial No. 654,622

6 Claims. (Cl. 23—14.5)

This invention relates to processes for decontaminating aqueous solutions containing nuclear fission products, and particularly to continuous processes for decontaminating aqueous reactor fuels taking the form of a phosphate complex of a fissionable element in a concentrated phosphoric acid solution.

Prior to the present invention, most of the effort in the field of solution depoisoning and decontamination was directed to aqueous solutions of uranyl nitrate, either used in that form as a reactor fuel or prepared from other forms of uranium contaminated with elements of the fission products category. Prior workers had found that a uranyl nitrate fuel could be decontaminated by a rather complicated process involving the addition of a weak (0.2 M) phosphoric acid and a source of ammonium ions to precipitate uranyl ammonium phosphate. This phosphate was then converted to the intermediate forms of uranous fluoride to uranyl fluoride, which in turn was converted to uranyl oxide, $UO_3$. The latter was finally added to nitric acid to form the uranyl nitrate in the reactor fuel, or one of the oxide or fluoride forms was reduced to the metal for fabrication into fuel elements.

Later workers developed the process wherein uranyl nitrate is extracted from its aqueous solution by organic compounds such as tributyl phosphate, diethyl ether, methyl isobutyl ketone, amyl alcohol, or amyl acetate, the organic solvent then being stripped of the uranyl nitrate by water or very dilute nitric acid. Where metallic uranium was desired, the nitrate was then converted to the oxide and then reduced to the metal. See Glasstone, Nuclear Reactor Engineering (New York: D. Van Nostrand Co., 1955), pp. 416–424, and vol. 9, Proceedings of the International Conference on the Peaceful Uses of Atomic Energy (New York: United Nations, 1956), pp. 453–531.

This stripping technique of the prior art depended for its success on the fact that uranyl nitrate is somewhat more soluble in water than in tributyl phosphate or other organic solvent, in the absence of an excess of nitrate ions. Such excess nitrate, extracted by the tributyl phosphate as a complex with nitric acid along with the uranyl nitrate, was essentially removed by the water in the first stripping stage because nitric acid forms a much weaker complex with tributyl phosphate than uranyl nitrate. However, although the excess of nitrate ions was not present in subsequent stages, the strength of the uranyl nitrate complex with the organic solvent is so high that a great deal of water was required for complete dissociation and stripping.

In the case of some solvents, e.g., tributyl phosphate, it was necessary to substitute a very dilute nitric acid rather than use plain water as the stripping agent to prevent the formation of an emulsion between water and the organic solvent. Strong nitric acid could not be used as this would drive the solution reactions in the wrong direction.

To obtain reasonable extraction efficiency with such water stripping, it was necessary to use 24 to 30 stripping stages, requiring a columnar structure 25 to 30 feet in height. The very dilute nature of the uranium-enriched product necessitated considerable evaporation and addition of nitric acid to restore the proper molarities before the product could be returned to the reactor.

None of these prior art processes involved a high concentration of phosphoric acid in the reactor fuel. On the one hand it was known that tributyl phosphate and the other solvents successfully used to extract uranyl nitrate would not extract uranium phosphate complexes. On the other hand, there was no known solvent for the extraction of uranium phosphate complexes. Although the tributyl phosphate process indicated that uranyl nitrate could be extracted into that compound, there was no method known in the prior art for directly converting the phosphate complex of a fissionable element to a hexavalent nitrate of such element. No obvious solution to this conversion problem was indicated, as the maximum extraction coefficient obtained with 6.0 M $HNO_3$ at a fuel dilution ratio of 16 was only 7.0, as indicated in the publication by one of the present inventors, Horace R. Baxman, "The Extraction of Uranium From Phosphate Solutions," LADC–2431, declassified May 21, 1956 (available through Technical Information Service, United States Atomic Energy Commission, P. O. Box 62, Oak Ridge, Tenn.), the disclosure of which paper is incorporated herein by reference. The problem presented to the present inventors was one of finding a salting agent which would not only furnish nitrate ions, but would also break down the uranyl phosphate complex without excessive dilution.

It is therefore an object of this invention to provide a method for converting uranium phosphate complexes in strong phosphoric acid to uranyl nitrate for subsequent decontamination by extraction into tributyl phosphate.

It is another object of this invention to provide a method for preferentially extracting the uranium in a solution of strong phosphoric acid without excessively diluting such solution.

A further object of this invention is to provide a method for extracting the uranium in a concentrated phosphoric acid solution from the phosphate and fission products in such acid without precipitating such uranium.

A still further object of this invention is to provide a method for stripping uranium from a uranium-enriched tributyl phosphate solution without the use of an excessive amount of water or very dilute nitric acid.

Another and further object of this invention is to provide a method for stripping uranium from a uranium-enriched tributyl phosphate solution by a method which does not depend on the preferential solubility of uranyl nitrate in water over that in tributyl phosphate in the absence of an excess of nitrate ions.

Another and further object of this invention is to provide a continuous process for the removal of fission products from a solution containing uranium phosphate complexes in concentrated phosphoric acid by an extraction method wherein the product contains the uranium phosphate complex and concentrated phosphoric acid in the same ratio of molar strengths as in the original solution.

Another and further object of this invention is to provide a continuous process for the removal of fission products from a solution of uranium in concentrated phosphoric acid by an extraction method wherein the product of the final stripping and washing stage requires only the evaporation of the nitric acid present and the restoration of any water evaporated with the nitric acid to restore the solution to its original volume containing the original uranium and phosphoric acid molarities.

The objects of the invention can be achieved by a continuous process of withdrawing a portion of the uranium-enriched phosphoric acid reactor fuel, adding to this fuel a soluble multivalent inorganic metal nitrate which will destroy the phosphate complex of uranium and at the same time furnish nitrate ions and form a soluble metal phosphate complex with a lower dissociation constant, and passing the salted aqueous fuel into a countercurrent liquid extraction column. Therein an immiscible organic solvent, selective for uranyl nitrate, extracts such nitrate with some nitric acid into solution and carries it to the top of the column while the denser aqueous solution, being immiscible with the organic solvent, carries the strong metal phosphate complex and the contamination products in the reactor fuel to the bottom of the column. The uranium is then restored to its original form and concentration by stripping it from the pregnant solvent with aqueous phosphoric acid solution, the organic solvent being drawn off as a raffinate. The product is boiled to remove that nitric acid extracted and regenerated in the process. By suitable selection of the concentrations of solvents, salt and stripping agent, the volume of fuel returned to the reactor per unit time is the same as that withdrawn and has the same concentration of uranium and phosphoric acid. Before returning the decontaminated fuel to the reactor, accumulated losses of uranium from fission within the reactor and from losses in the instant process are periodically restored. Since only a small volume of reactor fuel need be withdrawn to provide adequate decontamination, this volume is correspondingly added to that required in the reactor and it is not necessary to shut down the reactor.

The process is exemplified in the sole drawing attached hereto and incorporated in this specification by reference, in which is presented schematically a figure showing the apparatus employed, the flow of the various materials into and out of the parts of the apparatus, and the concentrations and amounts of materials at the various stages of the process for a particular use of this invention. This use involves the decontamination of the homogeneous fuel used in the Los Alamos Power Reactor Experiment (LAPRE–I). This fuel, as disclosed in the co-pending application of L. D. Percival King, entitled "Homogeneous Nuclear Power Reactor," S.N. 589,837, filed June 6, 1956, the disclosure of which is incorporated herein by reference, is an aqueous solution of 0.6 M uranyl ion and 7.5 M $H_3PO_4$, with a cold fuel volume of 62 liters at 20 degrees centigrade. The uranium enrichment for this reactor is preferably 93.4%. The reactor is designed to operate at a power level of 2 megawatts.

Referring now to the sole figure, the equipments are indicated by hollow blocks and the flow between equipments by lines with arrowheads to indicate the direction of flow. On each flow line is an arabic numeral indicating the liters per hour of material flowing through the line, with the one exception indicated, where the flow is in kilograms per hour.

From the reactor fuel tank 1, there is drawn 0.96 liter of reactor fuel per hour into feed tank 2, such fuel having the composition indicated above and containing the fission fragments and other contaminants formed by nuclear fission and other reactions occurring within the reactor. At the same time 3.06 kilograms per hour of an aqueous solution of ferric nitrate are fed from salt tank 3 into feed tank 2, said ferric nitrate being at the concentration of $Fe(NO_3)_3 \cdot 9H_2O$ dissolved in its own water of hydration at 40–50 degrees centigrade. This results in a dilution of the fuel solution of 2.8 compared with a factor of 16 or more necessary to obtain comparable extractions with nitric acid as the salting agent.

In feed tank 2, approximately one minute of mixing time is allowed to insure thorough reaction between the reactor fuel and the ferric nitrate salt. In this time the ferric ions destroy the uranyl phosphate complex and form a ferric phosphate complex, so that thereafter the feed solution contains essentially the ferric phosphate complex, uranyl nitrate, and nitric acid. The concentrations in the feed solution are 0.22 M $UO_2^{++}$, 2.7 M in $PO_4^{-3}$ and $Fe^{+3}$ ions, 8.1 M in $NO_3^-$ and 7.7 N free acid.

The feed solution is flowed from feed tank 2 at the rate of 2.8 liters per hour into the liquid-liquid countercurrent extraction column 4, an equipment of the type disclosed in U.S. Patent 2,493,265, issued on January 3, 1950, to E. G. Scheibel, entitled "Extraction Apparatus," above the second mixing section from the bottom. At the same time a 30 percent by volume solution of tributyl phosphate (TBP) in Kerosene A, a kerosene fraction having a density of about 0.76 g./cc. at 25° C., a viscosity of about 8.9 millipoises at 25° C., a boiling range of 165–198° C. and an aromatic content of about 9.1%, commonly known as "Gulf BT," said Kerosene A being used solely as a diluent, is introduced into the bottom of the extraction column 4 from solvent tank 5 at the rate of 3.8 liters per hour. At the top of the extraction column 4, an aqueous scrub solution of 1.7 M $Al(NO_3)_3$ is flowed from scrub tank 6 at the rate of 0.5 liter per hour.

When the aqueous feed solution comes into contact with the organic solvent, the much greater solubility of the uranyl nitrate in the tributyl phosphate in the presence of the excess nitrate ions causes the TBP to extract the uranyl nitrate from the feed solution according to the reactions:

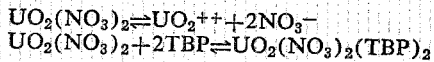

The excess nitrate ions from the ferric nitrate help to drive the first reaction to the left and the second to the right and thus aid in the extraction. At the same time, some of these excess nitrate ions combine with some of the excess hydrogen ions from the phosphoric acid to form a weaker complex with tributyl phosphate, according to the reactions:

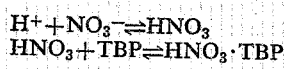

Thus some nitric acid is extracted with the uranyl nitrate and passes off in the organic solvent.

Since the tributyl phosphate does not have the same high solubility for the fission products carried by the aqueous feed solution that it does for the uranyl nitrate, most of the fission products remain in the aqueous solution and thus descend through the extraction column 4. However, at the 1.4 organic to aqueous flow ratio used (3.8/2.8) and the 30 volume percent concentration of tributyl phosphate in the kerosene carrier, there is some excess of the organic solvent and some fission fragments may be picked up. It is the function of the scrub solution descending from the top through three scrubbing stages to provide an excess of nitrate ion to remove such fission fragments from the tributyl phosphate and carry them to the bottom of the column. Although this scrubbing action by the aluminum nitrate also strips some uranyl nitrate from the tributyl phosphate, such uranyl nitrate is re-extracted by the TBP in the lower stages of the column. The scrub solution and the uranium-deprived feed solution, carrying off the fission fragments, descend through five extraction stages to the bottom of the column, where such raffinate is discharged as a contaminated waste. Owing to volume changes within the column, the discharge rate is slightly less than the 3.3 liter per hour total aqueous input.

The extraction coefficient obtained in this exemplification was 18.6, with 99+ percent of the uranium extracted from the feed solution. The concentrations in the pregnant solvent are 0.16 M in the uranyl nitrate and 0.7–.8 M in $HNO_3$, though both are still present as complexes with tributyl phosphate.

From the top of the extraction column 4, slightly more than 3.8 liters per hour of the pregnant organic solvent are withdrawn and passed to the stripping column 7 just above the second mixing section from the bottom. At the same time a 7.5 M solution of $H_3PO_4$ from acid tank 8 is added to the top of the stripping column 7 at the rate of 0.96 liter per hour and a wash solution of Kerosene A from wash tank 9 is added at the bottom of the stripping column at the rate of 0.2 liter per hour. This column is similar in structure to extraction column 4, the only difference being in function, as the top 6 sections are used for stripping and the bottom 2 sections for washing.

The action within stripping column 7 is essentially the destruction of the tributyl phosphate complexes of uranyl nitrate and nitric acid by the concentrated phosphoric acid, the formation of some nitric acid, and the formation of the uranyl phosphate complex with which the process was started.

The reactions involved are:

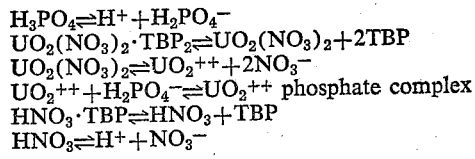

Since the uranyl phosphate complex is much stronger than the uranyl nitrate complex with tributyl phosphate, the net result of the mixing with excess of phosphoric acid in the absence of other complexing metal ions is the formation of the uranyl phosphate complex. There is no dependence on a small difference in solubilities, as in the case of the stripping of uranyl nitrate by water, because the uranyl phosphate complex is essentially insoluble in tributyl phosphate. Thus it is unnecessary to dilute the phosphoric acid stripping agent and it may be used in the same molar strength as is employed in the reactor itself.

Since uranyl phosphate is insoluble in tributyl phosphate and nitric acid only slightly soluble, the phosphoric acid carries the uranyl phosphate and most nitric acid down the column. The wash solution of kerosene passes up through the descending aqueous solution by countercurrent operation and removes the traces of tributyl phosphate from the aqueous solution. Together the stripped organic solvent and the wash solution are passed off from the top of the stripping column 7 as a raffinate at the rate of 4.0 liters per hour. This raffinate may be reworked for solvent regeneration, as indicated in the sole figure. The aqueous part of the mix, consisting of nitric acid, phosphoric acid and uranyl phosphate, is discharged from the bottom of the stripping tank and passed to nitrate removal tank 10 at the rate of 0.96 liter per hour. At this time it has concentrations of essentially 0.6 M $UO_2^{++}$ and 7.5 M $H_3PO_4$, together with about 1.2 N nitric acid.

In the nitrate removal tank 10 the nitric acid and some water are removed, by boiling, at the rate of about 0.5 liter per hour. The remainder, consisting of an aqueous phosphoric acid solution of the uranyl phosphate complex, is passed to fuel make-up tank 11, where the water removed with the nitric acid is returned at about 0.5 liter per hour to dilute the fuel to its original strength of 0.6 M $UO_2^{++}$ and 7.5 M $H_3PO_4$. At the same time, as a result of periodic samplings, accumulated losses in uranium or phosphoric acid, both in the reactor and in the process, may be made up at intervals. The solution then is being formed at 0.96 liter per hour and is returned at this rate to the reactor to complete the cycle.

The above-described process has been carried out with reactor fuels having activities of approximately 1.5 curies per liter. Over-all losses of uranium were as low as 0.07% in extraction and 0.2% in stripping. Decontamination factors obtained were at least 300 for gross beta activity and 5000 for gross gamma, such factors being difficult to determine because the measured activities of the final product could scarcely be distinguished from background.

The two columns employed in the above example are two inches in inside diameter and 50 inches in over-all height. Only these two columns 4 and 7, the fuel tank 1, nitrate removal tank 10 and fuel make-up tank 11, together with interconnecting piping, need be provided with biological shielding. The result is a compact, small-size shielded container for all of the above mentioned equipments, suitable for use with a reactor unit designed for use at remote locations with a minimum of maintenance.

It will be obvious to those skilled in the art that many changes in the above example are possible, depending on the ends to be attained. The process has been successfully applied, for one instance, to an aqueous reactor fuel consisting of a solution of uranous oxide in a more concentrated (95%) phosphoric acid, thus making it applicable to the reactor fuel disclosed in the co-pending application of R. Philip Hammond, entitled "Convection Reactor," S.N. 589,836, filed June 6, 1956, the disclosure of which is incorporated herein by reference. The use of the instant process with such fuel requires approximately twice as much dilution of the fuel as for the 7.5 M phosphoric acid concentration to keep the viscosity of the feed down to a workable level. (This increased dilution would be necessary in any case of an increased acid concentration, regardless of the nature or valence of the fissionable element.) It also requires oxidation of the uranium to the hexavalent form before extraction and reduction to the tetravalent at the end of the process. While the oxidation can be accomplished by the addition of hydrogen peroxide to the reactor fuel, it has been found to occur automatically in the practice of the present invention when the amount of ferric nitrate ($Fe(NO_3)_3 \cdot 9H_2O$) dissolved in its own water of hydration is added at the rate required to complex all of the phosphate in the fuel, including that in the excess acid. Reduction to the tetravalent form is accomplished by heating with a phosphorous acid, during which the latter is itself converted to the desired phosphoric form. A small amount of phosphine gas and elemental phosphorus are also formed in this reconversion, but these are easily removed by pumping and screening.

In the above detailed example, the amount of ferric nitrate added was just that required to complex all of the phosphate in the reactor fuel. The reason for this is apparent from the following table, which shows that a lesser amount of ferric nitrate causes a sharp reduction in the extraction coefficient for uranium ($E_a^0 (U)$) and percent uranium extracted. Since uranium forms a strong complex with phosphate, though not so strong as the ferric phosphate complex, any excess of phosphate ions brought about by a deficiency of ferric ions would complex the uranium and cause the uranium to remain in the aqueous solution. The cause for the falling off of extraction efficiency with excess ferric nitrate is an experimental fact, understood at present to be a back-salting of uranyl nitrate out of the tributyl phosphate by nitric acid.

*Table I*

EFFECT OF $Fe(NO_3)_3 \cdot 9H_2O$ ON EXTRACTION OF URANIUM

| Feed | Solvent |
|---|---|
| U=0.22 M<br>$PO_4$=2.7 M<br>$Fe(NO_3)_3$ as indicated | 30 volume percent TBP in Gulf BT<br>$\frac{\text{Organic flow rate}}{\text{Aqueous flow rate}}$=1.4 |

| Fe (M) | $E_a^0$ (U) | Percent U Extracted |
|---|---|---|
| 0.9 | 0.4 | 33.3 |
| 1.8 | 3.9 | 85.5 |
| 2.2 | 10.1 | 93.3 |
| 2.5 | 13.7 | 95.8 |
| 2.7 | 18.6 | 99+ |
| 2.9 | 16.1 | 98.9 |

It is obvious that the ratio of organic to aqueous flow rates and the concentration of tributyl phosphate can be varied from the values used in the above detailed example without departing from the spirit of the invention. A lower ratio of flow rates, organic to aqueous, or a lower concentration of tributyl phosphate at any one ratio would provide higher decontamination because the preferential solubility of uranyl nitrate would saturate the tributyl phosphate, leaving no room for the fission fragment nitrates. However, at the same time, there would be a greater loss of uranium in the aqueous solution, using the equipment and conditions exactly as hereinbefore described. In the case of an increased tributyl phosphate concentration to obtain maximum uranium extraction, a too large increase in viscosity presents flow problems and makes stripping more difficult. The values used in the example afford a balance offering high uranium recovery, reasonable viscosity for stripping and adequate depoisoning, though it is recognized that these values can be shifted to obtain greater decontamination without sacrificing extraction efficiency. This can be achieved, for one instance, by increasing the number of extraction stages without altering the flow rates or concentrations in the above example, or by decreasing the aqueous flow rate without changing the organic flow rate and without changing the number of stages or the concentrations. In either case the result is to give the same amount of tributyl phosphate more time to extract the same amount of available uranyl nitrate. Where it is desirable to provide the maximum removal of all fission products, biologically dangerous and poisonous nuclearly alike, the organic flow rate can be decreased without changing the aqueous flow rate and more stages can be added.

Although the process of this invention has been applied to uranium enriched in the U–235 isotope, it will work as well with normal uranium or any other isotope or mixture of isotopes of uranium.

The feasibility of the above process as applied to plutonium phosphate, tetravalent, hexavalent or a mixture of such oxidation states, has also been demonstrated. However, tributyl phosphate does not exhibit the same high selectivity for the plutonium nitrates over the fission product nitrates that it does for uranyl nitrate over the fission product nitrates. Under the same conditions as were used for extracting uranyl nitrate in the above detailed description, the extraction coefficient for plutonium is only about 3.0. This means that approximately 20 to 25 times the number of stages are required to obtain comparable results.

It is also demonstrable that the other aforementioned organic solvents used to extract uranyl nitrate in the prior art processes will succeed in the process of the present invention, as phosphate complexes are not extractable into such solvents. Tributyl phosphate was used in the embodiment set out above because it possesses a number of advantages, particularly in that it creates no explosive hazard.

In the detailed example above, ferric nitrate was used as the salting agent because the present inventors discovered that the ferric ion formed the strongest phosphate complex of many metal nitrates tried. Other nitrates such as aluminum nitrate, copper nitrate, calcium nitrate and even nitric acid can be used, but each of these has a much lower extraction coefficient than ferric nitrate. Each thus requires such a higher fuel dilution ratio and so many more extraction stages to obtain comparable results that none achieves the objects of this invention. Furthermore, none of these other nitrates has the ability of the ferric nitrate to oxidize uranium from the uranous to the uranyl state.

What is claimed is:

1. The process of removing fission products from aqueous solutions containing in concentrated phosphoric acid a phosphate complex of a fissionable element selected from the group consisting of uranium and plutonium comprising the steps of dissociating the phosphate complex of the fissionable element and forming a nitrate of the fissionable element, extracting the nitrate of the fissionable element into an organic solvent selected from the class consisting of tributyl phosphate, diethyl ether, methyl isobutyl ketone, amyl alcohol and amyl acetate, and stripping the fissionable element from said organic solvent with concentrated phosphoric acid of the same molar strength as in said aqueous solution.

2. A process for removing fission products from aqueous solutions containing a uranyl phosphate complex in concentrated phosphoric acid comprising the steps of dissociating the phosphate complex of uranium and forming uranyl nitrate, extracting the uranyl nitrate into an organic solvent selected from the class consisting of tributyl phosphate, diethyl ether, methyl isobutyl ketone, amyl alcohol and amyl acetate, and stripping the uranium from said organic solvent with concentrated phosphoric acid of the same molar strength as in said aqueous solution.

3. A continuous process for removing fission products from aqueous solutions containing in concentrated phosphoric acid a phosphate complex of a fissionable element selected from the group consisting of uranium and plutonium, comprising the steps of adding ferric nitrate to said aqueous solution, extracting the resulting nitrate of the fissionable element into a solvent selected from the class consisting of tributyl phosphate, diethyl ether, methyl isobutyl ketone, amyl alcohol and amyl acetate, stripping the fissionable element from said solvent with concentrated phosphoric acid, evaporating from the product the nitric acid extracted with the fissionable element, and adding the necessary water to restore the product to the molar strengths of fissionable element and phosphoric acid as in the original solution.

4. A continuous process for removing fission products from aqueous solutions such as reactor fuels containing a uranyl phosphate complex in concentrated phosphoric acid, comprising the steps of adding to said solution an amount of ferric nitrate solution having a number of ferric ions equal to the total number of phosphate ions in said solution and having a volume to dilute said solution by a ratio not exceeding three for a 7.5 molarity of said acid in said solution, extracting said uranium in the resulting form of uranyl nitrate into a tributyl phosphate solution, stripping the uranium from said tributyl phosphate solution with concentrated phosphoric acid of the same molar strength as in said aqueous solution, evaporating any nitric acid present, and restoring the water evaporated with the nitric acid.

5. A continuous process for removing fission products from aqueous solutions containing a uranous phosphate complex in concentrated phosphoric acid, comprising the steps of adding to said solution an amount of ferric nitrate solution containing a number of ferric ions equal to the total number of phosphate ions in said solution and having such a volume as to dilute said solution by a ratio not exceeding six for a 95% strength of said acid, extracting said uranium in the resulting form of uranyl nitrate into a tributyl phosphate solution, stripping said uranium from said tributyl phosphate solution with concentrated phosphoric acid, evaporating any nitric acid in said phosphoric acid, heating said phosphoric acid with phosphorus acid, and removing any resulting phosphine gas and elemental phosphorus.

6. A process for removing fission products from an aqueous solution containing a uranyl phosphate complex in concentrated phosphoric acid, comprising the steps of adding to said solution a ferric nitrate solution having a number of ferric ions equal to the total number of phosphate ions and a volume to dilute said solution by a ratio not exceeding three for a 7.5 M strength of said acid or 6.0 for 95% acid, extracting the resulting uranyl nitrate into a solvent selected from the class consisting of tributyl phosphate, diethyl ether, methyl isobutyl ketone, amyl alcohol and amyl acetate, stripping the uranyl ion from said solvent in the form of the original uranyl phosphate complex with concentrated phosphoric acid, evaporating any nitric acid present, and adding phosphoric acid in the concentration necessary to give the molarities of uranyl phosphate and phosphoric acid in said original aqueous solution.

References Cited in the file of this patent
UNITED STATES PATENTS 2,743,157    Hagemann et al. -------- Apr. 24, 1956

OTHER REFERENCES

Smellie et al.: AECD-3906, July 16, 1947, pp. 39, 51.

U.S. Atomic Energy Commission, K-706, by T. W. Bartlett, Feb. 27, 1951, pp. 6-14, 19, 24, 25.

Proceedings of the International Conference on the Peaceful Uses of Atomic Energy Held in Geneva Aug. 8-20, 1955, vol. 9, United Nations, N.Y., 1956, pp. 528-531, 490.

U.S. Atomic Energy Commission, LA-1942, by L. D. P. King, Apr. 13, 1955, pp. 4, 6, 7, 8. Available from AEC Technical Information Service, Oak Ridge, Tenn.